UNITED STATES PATENT OFFICE.

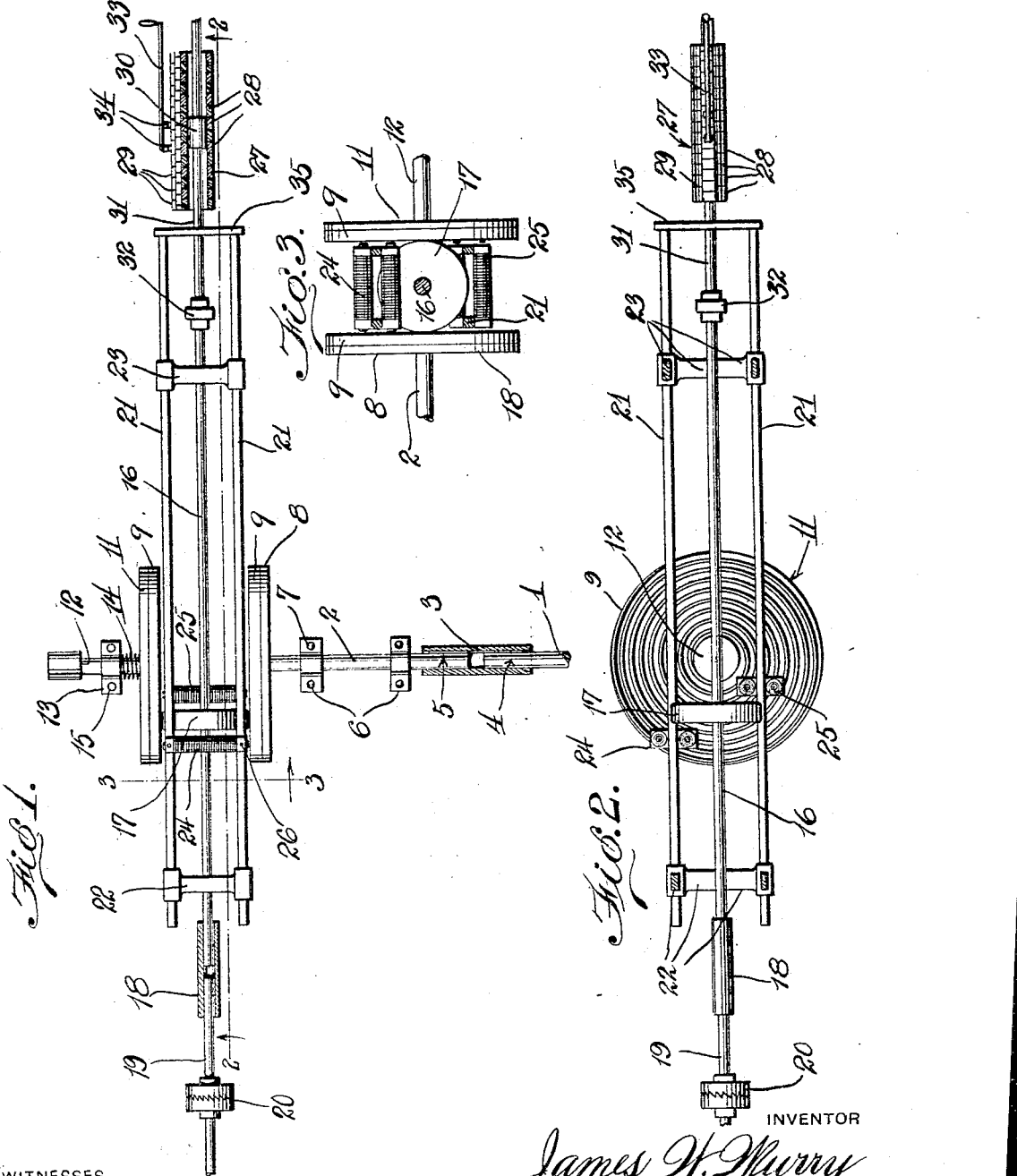

JAMES W. MURRY, OF MOUNDSVILLE, WEST VIRGINIA.

TRANSMISSION-GEARING.

1,288,129.
Specification of Letters Patent. Patented Dec. 17, 1918.

Application filed September 11, 1916. Serial No. 119,565.

*To all whom it may concern:*

Be it known that I, JAMES W. MURRY, a citizen of the United States, residing at Moundsville, in the county of Marshall and State of West Virginia, have invented certain new and useful Improvements in Transmission-Gearings, of which the following is a specification.

This invention relates to power transmitting mechanism.

The invention has more especial reference to a power transmission gearing of the frictional type, the same being so constructed as to allow a variable speed to be obtained, also, permitting the reversal of the direction of drive.

More particularly, the present invention has reference to the provision of means whereby the driving and driven gears will be drawn into engagement, consequently, providing the necessary pressure, thus, creating a powerful driving torque.

Another important characteristic of my invention, resides in the novel manner in which the driven element is shifted with relation to the driving element, whereby, to produce a changeable speed, the means for causing the shifting of the driven element comprising electromagnetic apparatus, which is loosely connected with the shaft of the driven element and, when energized, will shift the said shaft together with the driven gear, to a desired position upon the engaging face of the driving gear.

Another feature of the invention resides in the peculiar construction of the driving element, the same comprising a spirally wound strip of metal, the same being arranged about a suitable core to place the laminæ in the direction of the magnetic lines of force, so that a relative small area is presented in which eddy currents may be induced and circulate, thus minimizing the eddy currents.

The annexed drawing and the following description set forth in detail, certain mechanism embodying the invention, such disclosed means constituting, however, but one of the various mechanical forms in which the principle of the invention may be used.

In the drawings:—

Figure 1 is a top plan of my improved transmission gearing showing part thereof in section.

Fig. 2 is a longitudinal vertical section there-through taken on the line 2—2 of Fig. 1, looking in the direction of the arrows, and Fig. 3 is a transverse section taken on the line 3—3 of Fig. 1, looking in the direction of the arrow.

Referring to the drawing in detail, which illustrates a preferred embodiment of the invention and in which like reference numerals designate corresponding parts throughout the several views, a driving shaft 1 is provided, it being understood that the driving shaft extends outwardly into engagement with the prime mover to which the transmission is applied. This driving shaft 1 is splined to the driving shaft 2 of the transmission gearing, by means of the sleeve 3 and longitudinally disposed keys, 4 and 5, arranged upon the said shafts 1 and 2 respectively. It is to be noted, that driving shaft 2 is mounted within suitable bearings 6, these bearings being preferably secured to a suitable support by means of fastening devices, as at 7. Arranged upon the outer extremity of the driving shaft 2, is a friction disk 8, the said disk comprising a suitable base, upon which there is arranged, a spirally wound strip of metal 9, the edges thereof being secured to the adjacent face of the base by welding or the like and, the inner extremity thereof being secured to a core represented by the shaft 2 upon which the base 8 is concentrically carried. A second friction disk 11, constructed in a manner similar to the friction disk 8 and having a similar spiral metallic strip 9, is arranged opposite the latter and is carried upon one end of a stub shaft 12, this shaft being journaled within a suitable bearing 13 and so arranged therein, as to permit longitudinal movement of the same. A contractile coiled spring 14 is arranged about the stub shaft 12, its opposite ends are secured to the disk 11 and to the bearing 13, and its tension is exerted to draw disk 11 in a direction away from disk 8. The bearing 13 is fixedly secured to a suitable supporting means, in a manner similar to the bearings 6, as at 15.

Arranged at right angles to the driving shafts 1 and 2, there is a longitudinally arranged shaft 16, this shaft serving as a driven element and carries thereupon a friction gear 17. One end of the driven shaft 16, is received by a sleeve 18 and is splined thereto by means of the usual key connections. The remaining end of the sleeve 18 receives therein and has splined thereto, a power transmitting shaft 19, which shaft has interposed therein, a slip clutch 20, the same comprising a pair of clutch elements, the adjacent faces of which are serrated in the usual manner. Thus, should the power transmitting shaft 19 be subjected to a sudden or over-load, the clutch elements are so arranged as to allow for slippage at this point, consequently, easing the strain on friction gear 17, and thereby eliminating any possibility of the wearing of pockets within the friction surfaces of the disks 8 and 11. It is to be understood, that the power transmitting shaft 19 is connected with the construction to be operated, in the usual manner.

A frame, including a plurality of bars, generally indicated at 21 and extending parallel to the driven shaft 16, the said bars being supported by means of arms 22 and 23, is provided and carries thereupon, a plurality of electromagnets 24 and 25, the said magnets being affixed to the bars, as at 26 and being suitably insulated therefrom. It will be noted, that the magnets are secured to the opposite pairs of bars 21 and are arranged upon either side of the friction gear 17. The frame as constituted by the bars 21 and the supporting arms 22 and 23 is secured in such a manner as to move with the driven element 16, as the same is shifted, in order that the speed may be varied, the arrangement of which will be hereinafter more fully described.

In order to provide for means whereby the driven shaft 16 may be shifted longitudinally so that the friction gear 17 may be engaged at various points with the disks 8 and 11, thereby varying the speed of the said driven shaft, there is provided a solenoid 27, the same comprising a plurality of coils 28, each connected to a segment 29. A soft iron core 30 is arranged interiorly of the solenoid, and has connected therewith, the plunger 31, the outer end of said plunger being secured to the adjacent end of the driven shaft, by means of a loose coupling 32, the said coupling being so constructed as to permit the rotation of the driven shaft 16 and permit the plunger 31 to remain idle. An arm 33 is arranged in proximity to the segments of the solenoid and carries thereon, contact brushes 34. Thus, it will be apparent, that when the arm 33 is moved various groups of the coils 28 will be energized and will consequently cause the core 30 to be drawn or attracted thereto. By this arrangement, it is evident, that when the operator desires to change the speed of the transmission, the arm 33 with its contact brushes 34 is shifted into a desired position, thereby causing the plunger 31, through the medium of the core 30 to be moved longitudinally, which movement will in turn cause the driven shaft 16 with its friction gear 17 to be also shifted. By so shifting the gear 17, it is evident that the speed of the transmission will be changed, this being due to the increased or decreased driving area of the driving disk 8. The bars 21 are extended slightly beyond the supporting arms 23 and have affixed to the ends thereof, a bar 35, which bar has arranged therein a suitable opening for receiving the plunger 31, whereby the latter may be connected thereto. By so connecting the frame with the plunger 31, movement of the plunger will be transmitted to the frame and cause the same to be shifted with the driven shaft 16. Thus, the electromagnets 24 and 25 will, at all times, be maintained in proximity to the friction gear 17. In operation, when the operator is desirous of changing the speed of driven shaft relatively to the speed of the driving shaft, certain groups of the coils 28 as constituting the solenoid 27, are energized, as in the manner heretofore described, which energization will cause the driven shaft 16 to be shifted longitudinally, by means of its connection with the plunger 31. The electromagnets 24 and 25 are then energized, the current being supplied thereto from a suitable source through electrical conductors, (not shown), the passage of which may be controlled, if so desired, by an ordinary switch. With the driving magnets in energized condition, the driving disk 8 and the disk 11 will be drawn toward each other and consequently, will positively engage the periphery of the driving gear 17, thereby, providing the necessary pressure for creating a powerful driving torque and preventing the slipping of the friction gear 17. When the magnets 24 and 25 are de-energized, the disk 11 will be moved, by means of the contractile spring 14 out of engagement with the friction disk, while the driving disk 8 will be but loosely engaged with the said gear 17. Slippage of the driven gear 17, due to sudden or over-load upon the power transmitting shaft 19 will be eliminated by means of the slip clutch arrangement 20, thus, allowing the friction surfaces of the disks 8 and 11 to be worn evenly.

The strip 9 is preferably spirally arranged on the face of a driving disk as herein before explained and projects outwardly therefrom. This will place the laminæ in the direction of the magnetic lines of force so that a relative small area is presented in which eddy currents may be induced and circulate. As the convolutions of the spiral are spaced, the eddy currents will be more or less confined to the presented face or edge of the strip. This will lessen the heating effect as the area is small.

Other modes of applying the principle of my invention may be employed instead of the one explained, change being made as regards the mechanism herein disclosed, provided the means stated by any of the following claims or the equivalent of such stated means be employed.

I therefore claim as my invention:—

1. A transmission gearing including a driving element having a spiral strip on its surface, a driven element engageable with the driving element, and electro-magnetic means for urging the strip into engagement with the driven element.

2. A transmission gearing including coaxially disposed disks with opposing spirally striped surfaces, a driven element disposed between the disks, and electro-magnetic means for drawing the spirally striped surfaced disks into engagement with the driven element upon energization thereof.

3. A transmission gearing including a driving disk with a spirally striped surface, a coaxially disposed friction disk with a spirally striped surface in opposition to the spirally striped surface of the driving disk, a driven disk shiftable between said first mentioned disks, electrically operated means for moving the driving and friction disks toward the driven disk, and means connected with the friction disk for normally holding the friction disk from the driven disk.

4. A transmission mechanism including a drive disk having a spirally wound strip, a driven disk adapted to engage the spirally wound strip, and an electro-magnet adapted upon energization, to draw the spirally wound striped face driving disk toward the driven disk.

5. A transmission mechanism including a drive shaft having a disk surfaced with a spiral member having spaced convolutions, a coaxially disposed friction disk surfaced with a spiral member having spaced convolutions, said surfaces being opposed, means for normally urging the friction disk from the driving disk, and a driven disk disposed between the friction and driving disks with electrically operated means causing the mutual attraction of the various disks when energized.

6. The combination of the friction member and driven disk, means for normally pulling the friction member from the driven disk, electro-magnetic attracting means for counteracting the pulling means and causing the engagement of the friction member and driven disk, and a member with spaced portions set into the wearing surface of the friction member to improve the cohesion of the electro-magnetic means to reduce eddy currents.

7. A transmission gearing including a driving element, a driven element engageable with the driving element, electro-magnetic means for urging the driving element into engagement with the driven element, and said driving means including means for reducing eddy currents when the device is in operation.

8. A transmission gearing including a driving element having a striped surface, a driven element engageable with the driving element, electro-magnetic means for urging the driving element into engagement with the driven element, and said striped surface reducing eddy currents.

In testimony whereof I affix my signature in presence of two witnesses.

JAMES W. MURRY.

Witnesses:
JAMES F. SHIPMAN,
D. D. McCANDLE.

Copies of this patent may be obtained for five cents each, by addressing the "Commissioner of Patents, Washington, D. C."